United States Patent
Maillard (10) Patent No.: US 6,393,562 B1
(45) Date of Patent: May 21, 2002

(54) METHOD AND APPARATUS FOR PREVENTING FRAUDULENT ACCESS IN A CONDITIONAL ACCESS SYSTEM

(76) Inventor: Michel Maillard, 42, avenue du Maréchal Leclerc, F-28130 Maintenon (FR)

( * ) Notice: Subject to any disclaimer, the term of this patent is extended or adjusted under 35 U.S.C. 154(b) by 0 days.

(21) Appl. No.: 09/400,444

(22) Filed: Sep. 21, 1999

Related U.S. Application Data (63) Continuation of application No. PCT/EP98/01606, filed on Mar. 19, 1998.

(30) Foreign Application Priority Data

Mar. 21, 1997 (EP) .............................. 97400650
Dec. 5, 1997 (EP) .............................. 97402959

(51) Int. Cl.$^7$ ................................ H04N 7/16
(52) U.S. Cl. ................ 713/150; 713/168; 713/171; 713/180; 705/51; 606/79
(58) Field of Search .............. 713/150, 168, 713/171, 180; 705/51; 606/79

(56) References Cited

U.S. PATENT DOCUMENTS

| | | | |
|---|---|---|---|
| 4,868,866 A | * | 9/1989 | Williams, Jr. ............. 380/49 |
| 5,349,641 A | * | 9/1994 | Coutrot et al. ............. 380/10 |
| 5,937,067 A | * | 8/1999 | Thatcher et al. ........... 380/21 |
| 6,005,938 A | * | 12/1999 | Banker et al. ............. 380/20 |

FOREIGN PATENT DOCUMENTS

| | | | |
|---|---|---|---|
| EP | 0 153 837 A2 | 9/1985 | ........... H04N/7/16 |
| EP | 0 723 371 A1 | 7/1996 | ........... H04N/7/16 |
| EP | 0 763 936 A2 | 3/1997 | ........... H04N/5/913 |
| EP | 0 817 485 A1 | 1/1998 | ........... H04N/7/16 |
| WO | WO 85/00718 | 2/1985 | ........... H04N/7/16 |
| WO | WO 95/29560 | 11/1995 | ........... H04N/7/16 |
| WO | WO 96/06504 | 2/1996 | ........... H04N/7/167 |
| WO | WO 97/04553 | 2/1997 | ........... H04B/1/44 |

OTHER PUBLICATIONS

International Search Report, No. PCT/EP 98/01606, 4 pages.

\* cited by examiner

*Primary Examiner*—Thomas R. Peeso
*Assistant Examiner*—Todd Jack
(74) *Attorney, Agent, or Firm*—Sterne, Kessler, Goldstein & Fox, P.L.L.C.

(57) ABSTRACT

A receiver/decoder is programed only to accept a current entitlement control message (EMM) if it has received at least a previous EMM of a previous calendar period. When this is received, it is used to check present rights in the receiver/decoder. The invention prevents an original subscriber from fraudulently obtaining rights by disconnecting a decoder (before an authorising message can update the decoder's memory to prevent decryption) and by reconnecting the decoder (so as to be mistaken for a new subscriber legitimately having those rights).

21 Claims, 8 Drawing Sheets

— JAN

— FEB

— MAR

METHOD AND APPARATUS FOR PREVENTING FRAUDULENT ACCESS IN A CONDITIONAL ACCESS SYSTEM

This application is a contiuation of PCT/EP98/01606, filed Mar. 19, 1998, which is a continuation of PCT/EP97/02106, filed Apr. 25, 1997.

The present invention relates to a method of and apparatus for preventing fraudulent access in a conditional access system linked to a subscriber's receiver/decoder. The technique may be used in the field of data communication where transmitted encrypted data is received and decrypted by, for example, an authorised subscriber's receivcer/decoder.

The term "receiver/decoder" used herein may connote a receiver for receiving either encoded or non-encoded signals, for example, television and/or radio signals. The term may also connote a decoder for decoding received signals. Embodiments of such receiver/decoders may include a decoder integral with the receiver for decoding the received signals, for example, in a "set-top box" or such a decoder functioning in combination with a physically separate receiver.

The receiver/decoder is stated above as being "linked to" the conditional access system, which includes the possibilities that the receiver/decoder either forms part of or is separate from the conditional access system.

In particular, but not exclusively, the invention may be used in a mass-market broadcast system having some or all of the following preferred features. It may be an information broadcast system, preferably a radio and/or television broadcast system; it may be a satellite system (although it could be applicable to cable or terrestrial transmission); it may be a digital system, preferably using the MPEG, more preferably the MPEG-2, compression system for data/signal transmission; it may afford the possibility of interactivity; and it may use smartcards. Again, the invention may be used in conjunction with a digital audio visual transmission system. In the context of the present invention the term "digital audio visual transmission system" refers to all transmission systems for transmitting or broadcasting primarily audio visual or multimedia digital data. Whilst the present invention is particularly applicable to a broadcast digital television system, the present invention may equally be used in filtering data sent by a fixed telecommunications network for multimedia internet applications etc. As used herein, the term "smartcard" includes, but not exclusively so, any chip-based card device possessing, for example, microprocessor and/or memory storage. Also included in this term are chip devices having alternative physical forms, for example key-shaped devices such as are often used in TV decoder systems.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

An aim of the invention is to provide a data communication method, transmitter and receiver/decoder which can be used to provide data to, for example, subscribers or other buyers of reception rights on a secure basis.

In existing broadcasting systems, a smartcard is used by a subscriber to obtain the reception right and it has been found pursuant to the present invention that there is a problem of preventing misuse of the card to defraud the owner of the rights.

For example, in a known MPEG television subscriber system, the rights of different subscribers or groups of subscribers can be checked centrally, for instance on a monthly basis, and an authorising message can be subsequently sent, from a central station, to each subscriber or group of subscribers to authorise (or to block) use of the rights. Suitably, the authorising message is simply a "1" or "0" located in different bitmap positions which have been assigned to respective subscriber identities for the month, only the presence of a "1" authorising use of the right for the subscriber at the respective bitmap position, a "0" denying use of that right. The following problem with this system has been identified pursuant to the present invention. If, for example, the original subscriber ceases payment for the right, after a lapse of time, the system will no longer identify the original subscriber at the previously assigned bitmap position and this position may then be newly assigned to the identity of a "new" subscriber. If the new subscriber has paid for and hence been authorised to use the right, there will be a "1" again in the bitmap position. If, at the "original" subscriber's receiver/decoder, the decoder is disconnected before the next authorising message can update a linked conditional access system (associated with the "original subscriber") and if the decoder is later reconnected (or if a clock is re-set), the "original" subscriber will then be mistaken for the "new" subscriber who has been authorised to use the right and the "original" subscriber will thereby fraudulently obtain the right.

The present invention seeks to solve this problem and other similar or related problems where subscriber rights may be granted over periods of time which may depend typically, but not exclusively, on settling accounts. For example, rights may be granted for considerations other than payment where different subscribers can be authorised to use a system to gain access to a secure area, or to secure information, or to some other secure service.

In the context of the present invention the terms "EMM" and "ECM" are utilised.

An Entitlement Management Message or EMM is a message designated to one subscriber or to a group of subscribers. It is usually generated by a subscription authorisation system and is multiplexed with an MPEG-2 stream. It is usually encrypted with a so-called "management" key for example for group use. Hence it may be encrypted by a key common to all subscribers in a group of subscribers.

An Entitlement Control Message or ECM is a message sent in relation with one scrambled program. The ECM enables a user to descramble a control word to obtain the right to descramble a television (or similar) programme. A key (termed herein an "ECM key") is passed through the EMM to a subscriber because the smartcard used by the subscriber needs the ECM key to decipher the ECM. The deciphered ECM is used to descramble the control word and hence to descramble the program.

According to one aspect of the present invention there is provided a method of preventing fraudulent access in a conditional access system which is linked to a subscriber's receiver/decoder for receiving an entitlement management message (EMM) for a group of subscribers to enable said system to provide access for a respective subscriber, the method including the step of:

programming the receiver/decoder only to accept a current EMM of a current calendar period if it has received at least a previous EMM of a previous calendar period.

Hence the problem of preventing fraudulent access can be solved.

The method preferably further comprises the steps of:
transmitting redundant date information with the current EMM; and receiving the current EMM and using redundant date information to check whether said previous EMM has been received.

In a first preferred embodiment, each EMM contains rights date information concerning a current right of access and corresponding check date information concerning a previous right of access, such check date information constituting the redundant date information. This can be a particularly efficient way of putting the invention into practice.

In a second preferred embodiment, the redundant date information is an ECM key of a previous calendar period. This is a convenient alternative way of representing such information.

The subscriber rights may change on a regularly timed basis and the redundant date information may concern an immediately preceding period.

In one illustrative example of the invention, wherein the receiver/decoder is one of a plurality of receiver/decoders in a broadcast system, the subscribers need to have paid for a current month for the right to receive a program or programs and the subscriber rights could change on a monthly basis (since some may not have paid). The bitmap may then be used to indicate the rights for the current month. In this case, when the current EMM is received by the decoder, the redundant date information, e.g. the "previous" ECM key, would be that of the immediately preceding month. However, it is not essential to have sequential periods, since the "current" and "previous" periods may be non-adjacent in time and there could be irregular amounts of real time between such periods. Typically, nonetheless, the previous EMM is for an immediately preceding calendar period, and the periods are sequential.

When there are changes in subscriber rights, it is preferable to include, in the current EMM, a subscriber bitmap having positions representing subscription rights of the subscribers in the group. However, this is unnecessary in situations where all subscribers are authorised, for example, where all subscribers have paid their subscriptions for the respective calendar period; hence this may only occur when there are changes in subscriber rights.

According to another aspect of the invention, there is provided a transmitter for use in a method of preventing fraudulent access in a conditional access system which is linked to a subscriber's receiver/decoder for receiving an entitlement management message (EMM) for a group of subscribers to enable said system to provide access for a respective subscriber, the receiver/decoder being programmed only to accept a current EMM of a current calendar period if it has received at least a previous EMM of a previous calendar period, the transmitter including:

means for transmitting redundant date information with a current EMM of a current calendar period so that the redundant date information can be used by the receiver/decoder to check whether said previous EMM has been received.

Each EMM preferably contains rights date information concerning a current right of access and corresponding check date information concerning a previous right of access, such check date information constituting the redundant date information. Alternatively, the redundant date information may be an ECM key of a previous calendar period.

According to another aspect of the invention, there is provided a receiver/decoder for use in a method of preventing fraudulent access in a conditional access system, the receivcer/decoder being linked to the conditional access system and being provided for receiving an entitlement management message (EMM) for a group of subscribers to enable said system to provide access for a respective subscriber, the receiver/decoder including:

means programmed only to accept a current EMM of a current calendar period if it has received at least a previous EMM of a previous calendar period.

Said means may be programmed to check whether said previous EMM has been received by using redundant date information contained in the current EMM.

Each EMM may contain rights date information concerning a current right of access and corresponding check date information concerning a previous right of access, such check date information constituting the redundant date information. Alternatively, the redundant date information may be an ECM key of a previous calendar period.

The invention further provides a receiver/decoder substantially as herein described with reference to and as illustrated in the accompanying drawings.

Although preferred embodiments of the invention relate to a satellite television system, the invention is applicable to other data communication networks including cable networks (not necessarily handling television signals).

Preferred features of the invention are now described below, purely by way of example, with reference to the accompanying drawings, wherein.

Figure 1:
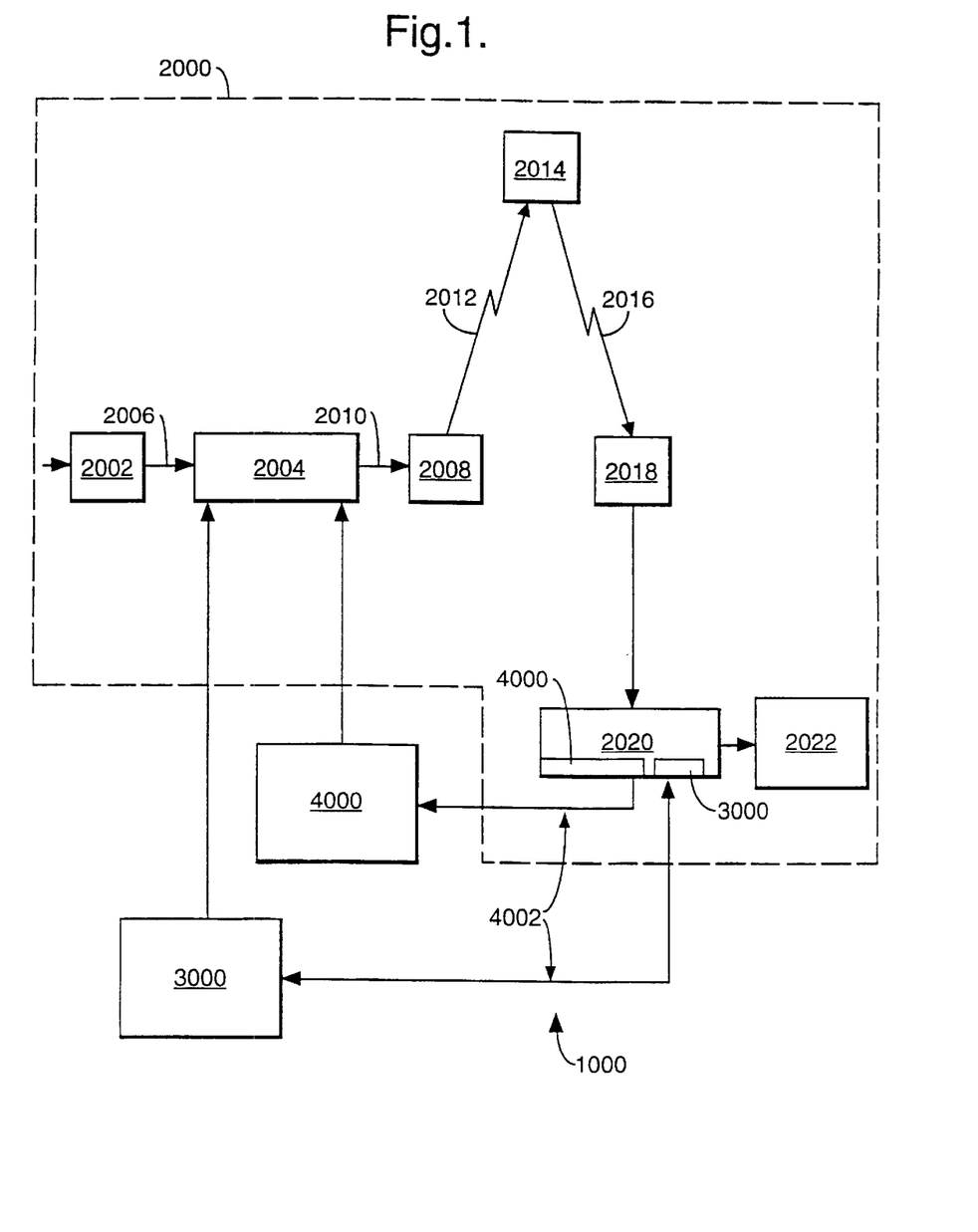
FIG. 1 shows the overall architecture of a digital television system.

FIG. 1 shows a digital broadcast and reception system 1000 including a conventional digital television system 2000 which uses the known MPEG-2 compression system to transmit compressed digital signals. MPEG-2 compressor 2002, in a broadcast centre, receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecom links. The transmitter 2008 transmits electromagnetic signals via uplink 2012 towards a satellite transponder 2014, where they are electronically processed and broadcast via notional downlink 2016 to earth receiver/decoder 2018, conventionally in the form of a dish owned or rented by the end user. The signals received by receiver/decoder 2018 are transmitted to an integrated receiver/decoder of 2020 owned or rented by the end user and connected to the end user's television set 2022. The receiver/decoder 2020 decodes the compressed MPEG-2 signal into a television signal for the television set 2022.

A conditional access system 3000 (allowing access on a conditional basis) is connected to the multiplexer 2004 and the receiver/decoder 2020, and is located partly in the broadcast centre and partly in the decoder. It enables the end user to access digital television broadcasts from one or more broadcast suppliers. A smartcard, capable of decrypting messages relating to commercial offers (that is, one or several television programmes sold by the broadcast supplier), can be inserted into the receiver/decoder 2020. Using the decoder 2020 and smartcard, the end user may purchase events in either a subscription mode or a Pay-Per-View mode.

The conditional access system 3000 includes a Subscriber Authorization System (SAS). The SAS is connected to one or more Subscriber Management Systems (SMS), one SMS for each broadcast supplier, by a respective TCP-IP linkage (although other types of linkage could alternatively be used). Alternatively, one SMS could be shared between two broadcast suppliers, or one supplier could use two SMSs, and so on.

An interactive system 4000, also connected to the multiplexer 2004 and the receiver/decoder 2020 and again located partly in the broadcast centre and partly in the decoder, enables the end user to interact with various applications via a modemmed back channel 4002.

As the construction and operation of the digital television system is generally known, no further details will be given.

Figure 2:
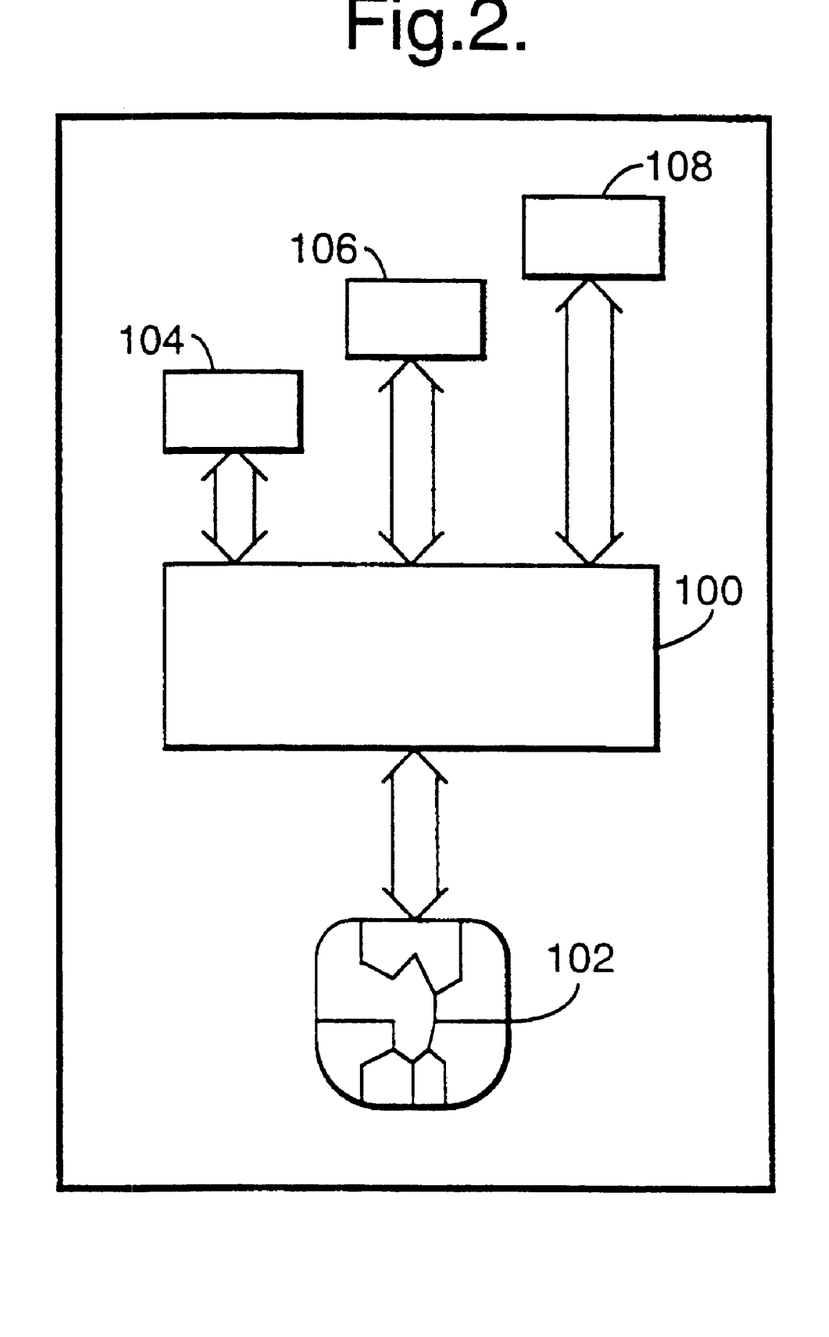
FIG. 2 shows the overall structure of a smartcard.

A daughter, or "subscriber", smartcard is schematically shown in FIG. 2 and comprises an 8 bit microprocessor 100, such as a Motorola 6805 microprocessor, having an input/output bus coupled to a standard array of contacts 102 which in use are connected to a corresponding array of contacts in the card reader of the receiver/decoder 2020, the card reader being of conventional design. The microprocessor 100 is also provided with bus connections to preferably masked ROM 104, RAM 106 and EEPROM 108 The smartcard complies with the ISO 7816-1, 7816-2 and 7816-3 standard protocols which determine certain physical parameters of the smartcard, the positions of the contacts on the chip and certain communications between the external system (and particularly the receiver/decoder 2020) and the smartcard respectively and which will therefore not be further described here. One function of the microprocessor 100 is to manage the memory in the smartcard.

Figure 3:
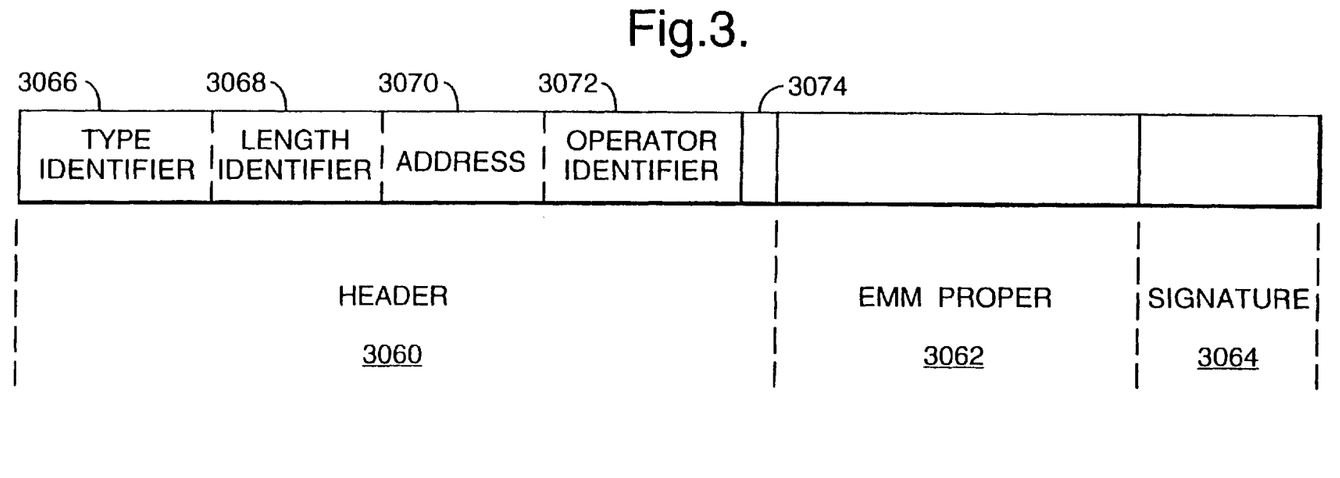
FIG. 3 shows the structure of an Entitlement Management Message (EMM) used in the conditional access system.

The structure of a typical EMM is now described with reference to FIG. 3. Basically, the EMM, which is implemented as a series of digital data bits, comprises a header 3060, the EMM proper 3062, and a signature 3064. The header 3060 in turn comprises a type identifier 3066 to identify whether the type is individual, group, audience or some other type, a length identifier 3068 which gives the length of the EMM, an optional address 3070 for the EMM, an operator identifier 3072 and a key identifier 3074. The EMM proper 3062 of course varies greatly according to its type. However, in the present context the EMM is a so-called "Group Renewal" EMM, as shortly described. Finally, the signature 3064, which is typically of 8 bytes long, provides a number of checks against corruption of the remaining data in the EMM.

The present invention is primarily concerned with the following background.

BACKGROUND OF THE INVENTION

Figure 4:
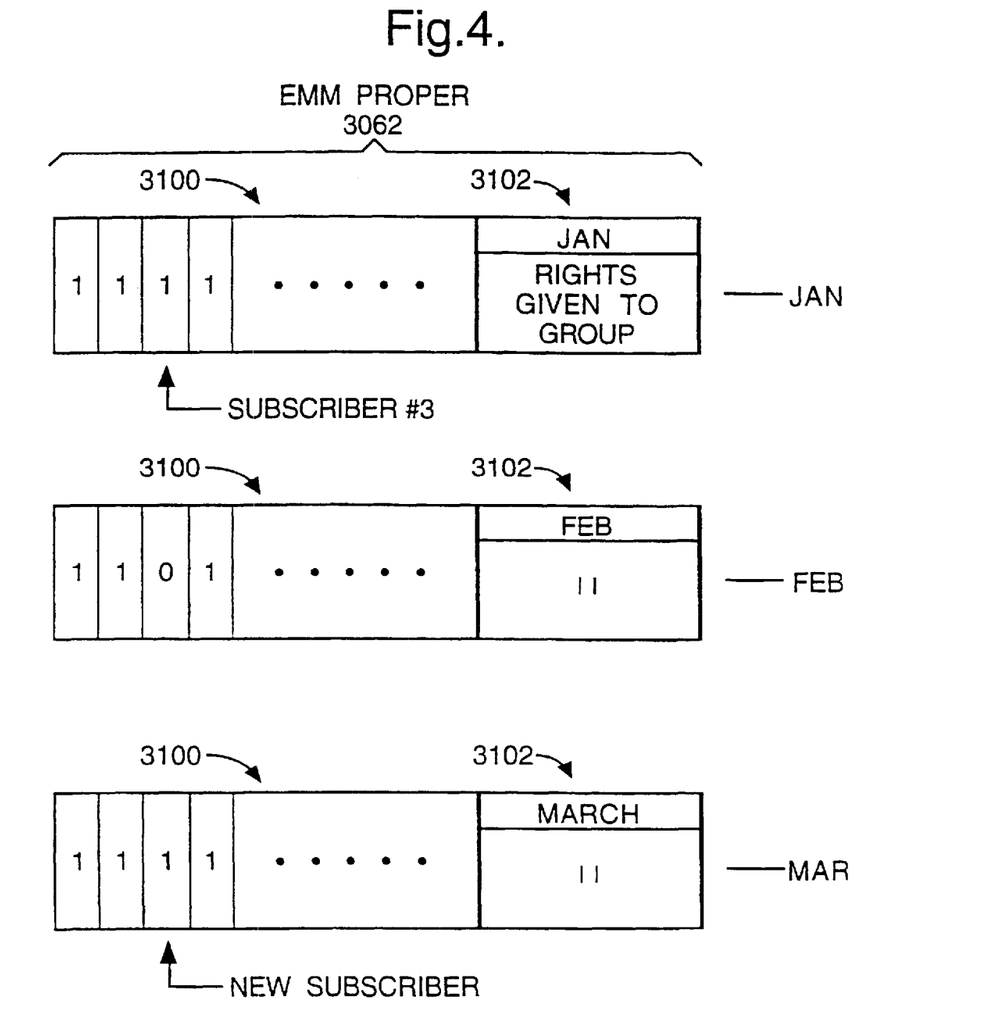
FIG. 4 shows the structure of an EMM encrypted by a group management key Kg common to all subscribers in a group and is included for illustrating a problem encountered in existing systems.

In existing broadcasting systems using MPEG, in order to reduce bandwidth required to send the monthly subscriber authorisation (EMM) messages, it is customary to use a group renewal EMM, encrypted by a group management key Kg common to all subscribers in the group. As shown in FIG. 4, the EMM proper includes a subscriber bitmap 3100, typically of 256 bits. Each bit of the bitmap corresponds to a subscriber. In the example given, bit #3 corresponds to subscriber #3. The EMM proper also includes a rights section 3102 detailing the subscription rights of all the subscribers in the group for that month and including the ECM key for that month and typically the following month. Assuming the subscriber has correctly paid his subscription for January, the presence of a positive bit 1 at this position will indicate to the subscriber's decoder (after he has decrypted the message with key Kg) that the subscriber is indeed entitled to receive programmes in this group as defined by the subscription rights section. Individual programmes are descrambled using effectively an ECM decrypted using the ECM key.

If the subscriber does not pay the necessary fee for February, the bitmap will include a zero bit 0 at this position. After the smartcard in the receiver/decoder has decoded the message, the presence of a zero at bit #3 will indicate to the decoder that it is no longer entitled to receive these rights and the smartcard will note this and appropriate action is taken. In practice, the instruction to delete the relevant key may be sent in a separate EMM.

For the month of March, it is quite possible that a new subscriber may be brought into the group. This happens quite regularly, as the subscriber groups are often re-organised to reduce the number of groups and the number of EMM messages that need to be sent. In this case, the new subscriber will be assigned the bit #3. When the new subscriber decodes the message with his key Kg he will detect a positive bit 1 at this position indicating his entitlement to receive the rights corresponding to this group.

The system described above has now been found to be relatively easy to defraud. In the case of the subscriber #3, he can simply disconnect his decoder in February. If he does this, he will not receive the EMM of February, nor any instruction to delete the relevant key.

Reconnecting the decoder in March will enable the now fraudulent decoder to decode the EMM of March, including the positive bit message (intended for the new subscriber) at bit #3. The decoder will then conclude it can continue to obtain the rights associated with this group, and an anomalous situation will arise in which the bit #3 of the group message will effectively give rights to two decoders; the new legitimate subscriber and the previous fraudulent subscriber.

PREFERRED EMBODIMENTS OF THE INVENTION

Figure 5:
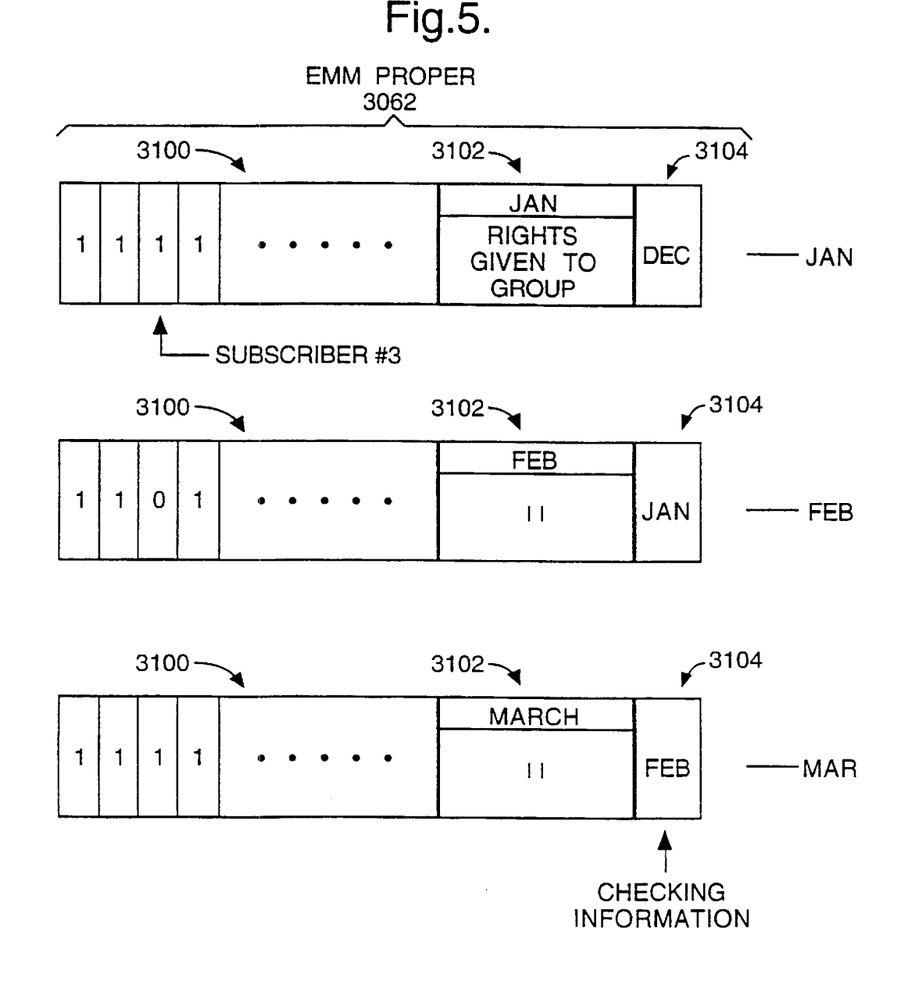
FIG. 5 shows part of the structure of an EMM encrypted in accordance with the invention.

This problem is overcome by transmitting sequential redundant check date information with each EMM as shown in overview in FIG. 5. Each receiver/decoder 2020 is programmed only to accept an EMM message if it has received at least the EMM of the previous month. Since the rights change every month it is simply necessary to check the present rights stored in the decoder (as contained in the present rights section 3102) against the previous rights (as contained in a previous rights section 3104).

Figure 6:
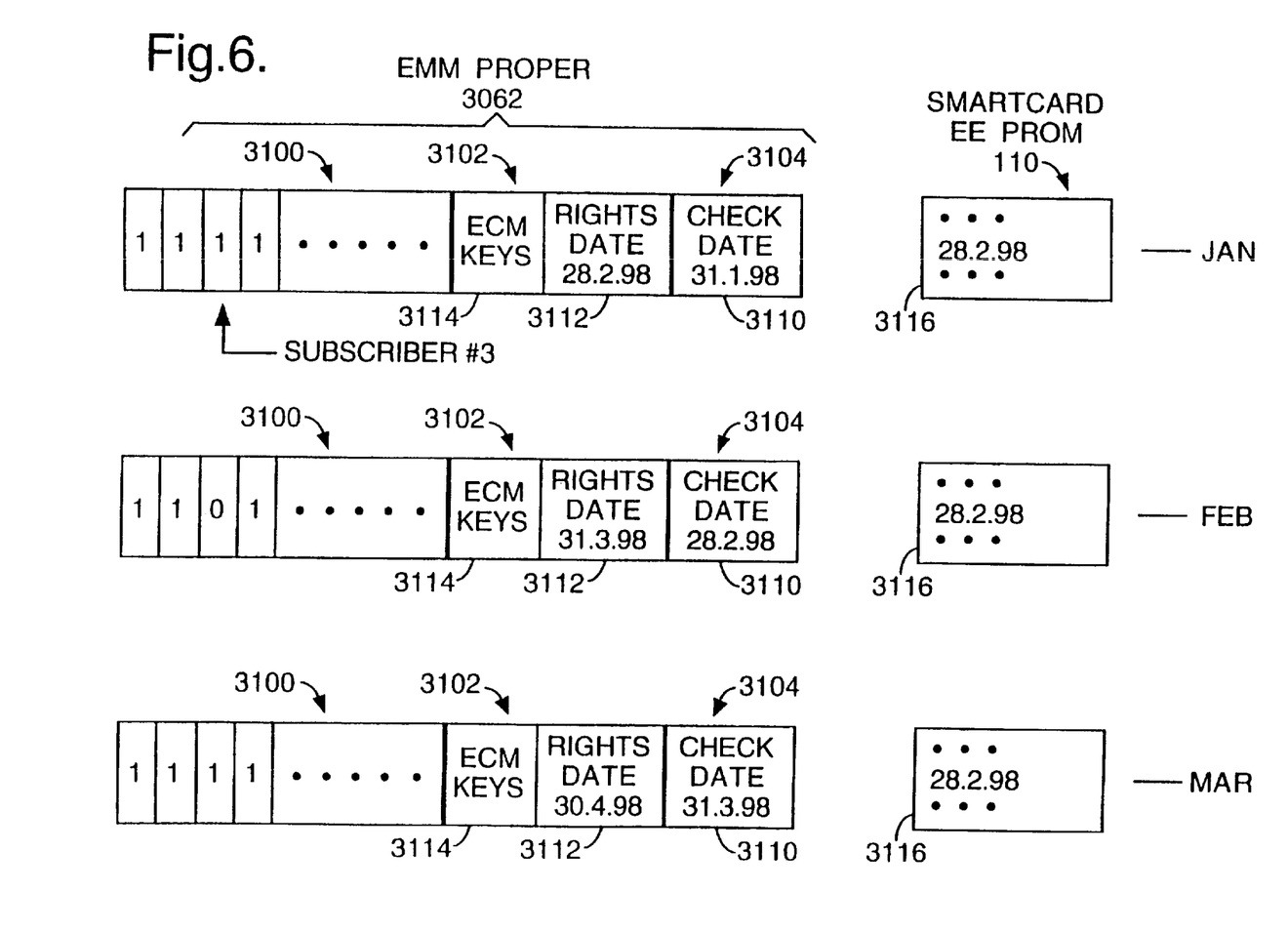
FIG. 6 illustrates a first preferred embodiment.

In a first preferred embodiment, described now in more detail with reference to FIG. 6, the present rights stored in the receiver/decoder are checked against the previous rights by means of redundant date information in the form of a check date 3110. Hence the EMM proper 3062 contains the check date 3110 in addition to a rights date (or obsolescence date) 3112 representing the date until which the new rights contained in the EMM will be valid. The check date is one month (or another suitable time period) earlier than the rights date. The EMM proper also contains the rights themselves, in the form of one or typically more ECM keys 3114; at least an ECM key for the present month is provided, as well —in the preferred embodiment —as an ECM key for the following month.

FIG. 6 also shows the relevant contents of the EEPROM 108 of the smartcard illustrated in FIG. 2. These contents are, the rights date 3116 as stored in the smartcard.

Figure 7:
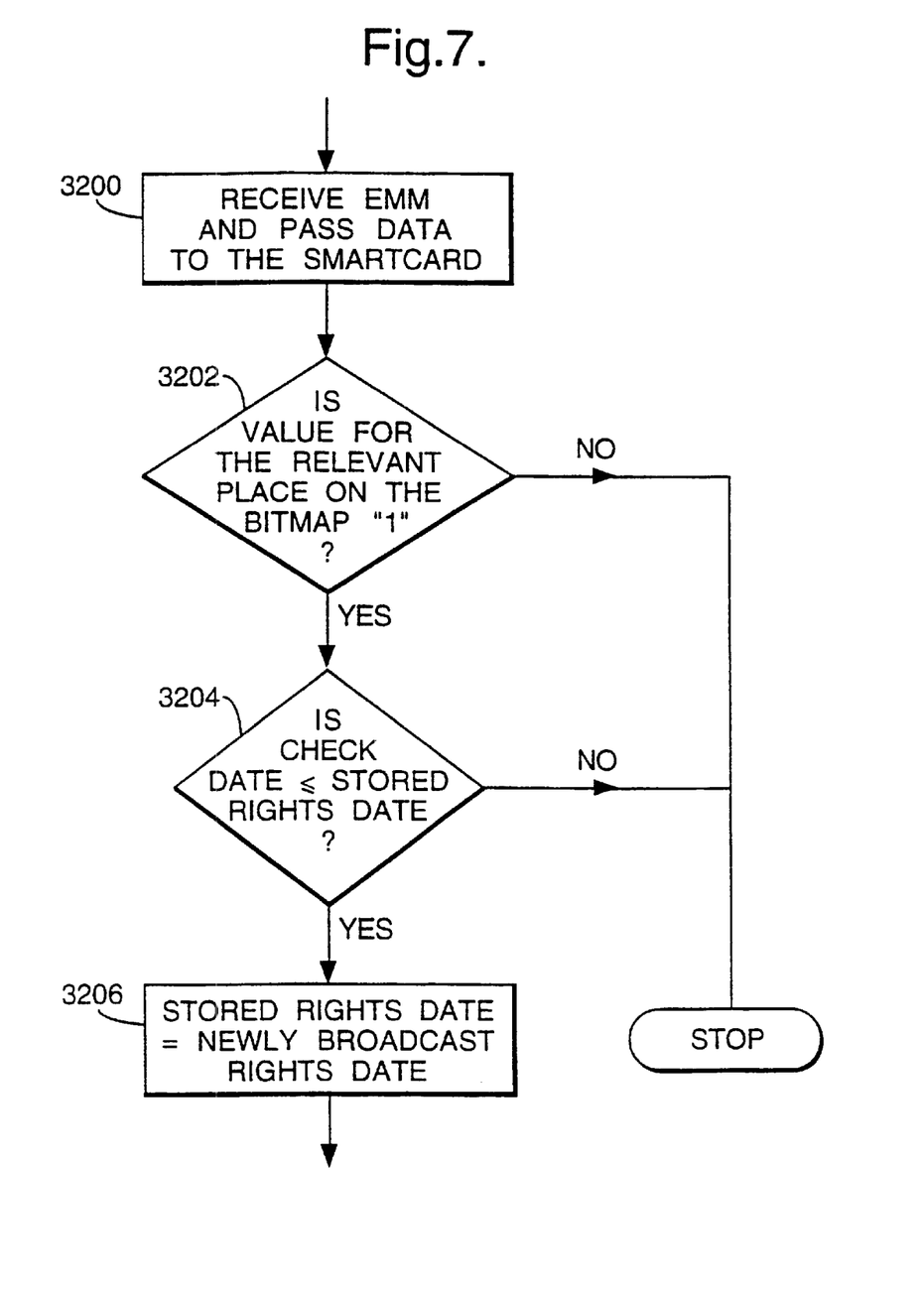
FIG. 7 is a flow diagram illustrating the first preferred embodiment.

The manner in which the group renewal EMMs are now processed is described with reference to the flow diagram of FIG. 7. In a first step 3200 the EMM is received by the receiver/decoder 2020 and the relevant data passed to the smartcard, which is plugged into the receivcer/decoder and is for the present purposes considered as part of the receiver/decoder. The EMM is processed by the smartcard microprocessor 100 in conjunction with the various memories 104, 106 and 108. In a second step 3202 the subscriber bitmap 3100 is checked in respect of the relevant subscriber. If a "1" appears in the relevant place in the bitmap, the microprocessor processes the EMM further, If a "0" appears in the relevant place, then processing is halted. In a third step 3204, the stored rights date 3116 is checked against the check date 3110. If the check date is less than or equal to the stored rights date then processing is continued; otherwise processing is halted. In a fourth and final step 3206, the stored rights date 3116 is changed under the control of the microprocessor to the newly broadcast rights date 3112. The broadcast ECM keys 3114 can then be used appropriately.

Returning now to FIG. 6, the operation of the first preferred embodiment is followed with reference to the three rows representing (by way of example) January, February and March 1998. It will be appreciated firstly that group renewal EMMs are broadcast at a number of times throughout the relevant month. For the month of December 1997 the smartcard EEPROM 108 will have stored the rights date of Jan. 31, 1998, so that the relevant ECM key for December can be used. For January, given that the January (following month) ECM key was broadcast with the December EMM and that the rights date is Jan 31, 1998, the subscriber will continue to have rights even before the January EMM is successfully received. On first successful receipt of the January EMM, since the check date of Jan. 31, 1998 is no later than the stored rights date of Jan. 31, 1998, the stored rights date is changed to the newly broadcast rights date 3112, which date is Feb. 28, 1998. On further receipt of the January EMM during January, steps 3200 to 3206 as shown in FIG. 7 are carried out, but no change is made to the stored rights date.

In February, if on the one hand subscriber #3 has left his receiver/decoder 2020 switched on, the February EMM will be received and passed to the smartcard, but since (in step 3202 of FIG. 7) the value for the relevant place in the bitmap is "0" then no change will be made to the stored rights date, which will remain as Feb. 28, 1998. If on the other hand the receiver/decoder 2020 is left switched off, similarly no change will be made to the stored rights date, albeit (it will be understood) for somewhat different reasons.

In March, regardless of whether the value of the relevant place on the subscriber bitmap is now "1" or "0", the stored rights date will again not change because the check date of Mar. 31, 1998 will be later than the stored rights date of Feb. 2, 1998, and hence the subscriber will not have an ECM key which he can use for March. His rights will therefore have been effectively stopped. In fact, the rights can only be reinstated by means of a special reactivation EMM.

In a second preferred embodiment, which may be considered as being particularly closely related to the first preferred embodiment, the check date 3110 in the broadcast EMM is replaced by the previous month's ECM key, and the stored rights date 3116 is replaced by the current month's (as opposed to the following month's) ECM key. Hence last month's ECM key is broadcast in current month's message. Comparison is made between either the ECM keys themselves or the date associated with (and broadcast with) the ECM keys. In either case, the broadcast ECM key is considered as representing redundant date information, since the ECM key itself is associated with a particular month.

Hence, with reference to FIG. 5, before first receipt of the January EMM (which will contain the December ECM key as the redundant date information), the smartcard will have stored in it the December ECM key. The result of a comparison between the broadcast and stored ECM keys will be positive, and hence the December ECM key will be changed to the January ECM key.

If the fraudulent subscriber has disconnected the decoder in February, the last rights received will be January. When the EMM for March arrives, the decoder will detect the absence of the ECM key of February and take appropriate action, for example alerting the system authority of a problem, refusing to transfer the rights of March, and so on.

The first two preferred embodiments are particularly preferred since they employ, as information stored in the smartcard, information which would typically in any event be stored. This affords an economical use of storage space within the smartcard.

In a third preferred embodiment, redundant date information is stored in the smartcard for more than one previous month. For example, as well as the information being stored for the immediately preceding month, it may be stored for say one or two previous months.

In a fourth preferred embodiment, the check date 3110 may be replaced by any suitable verification data 3110 (as for example a completely different, possibly random, check date or other random number), and this could correspondingly be stored in the smartcard instead of the stored rights date 3116. In such circumstance, in addition to the rights date 3112 further verification data may be broadcast, and it may be this data rather than the rights date 3112 which may be stored in the smartcard for the following month for comparison with the verification data 3110.

In a fifth preferred embodiment, no redundant date information is broadcast; rather the smartcard or recciver/decoder keeps a record of whether each month's EMM has been received. If the previous month's EMM has not been received, then, as per the first embodiment described above, further processing of the current month's EMM is halted. The record might, for example, be in the form of table. The table might contain each month's EMM or ECM or a portion of it.

Figure 8:
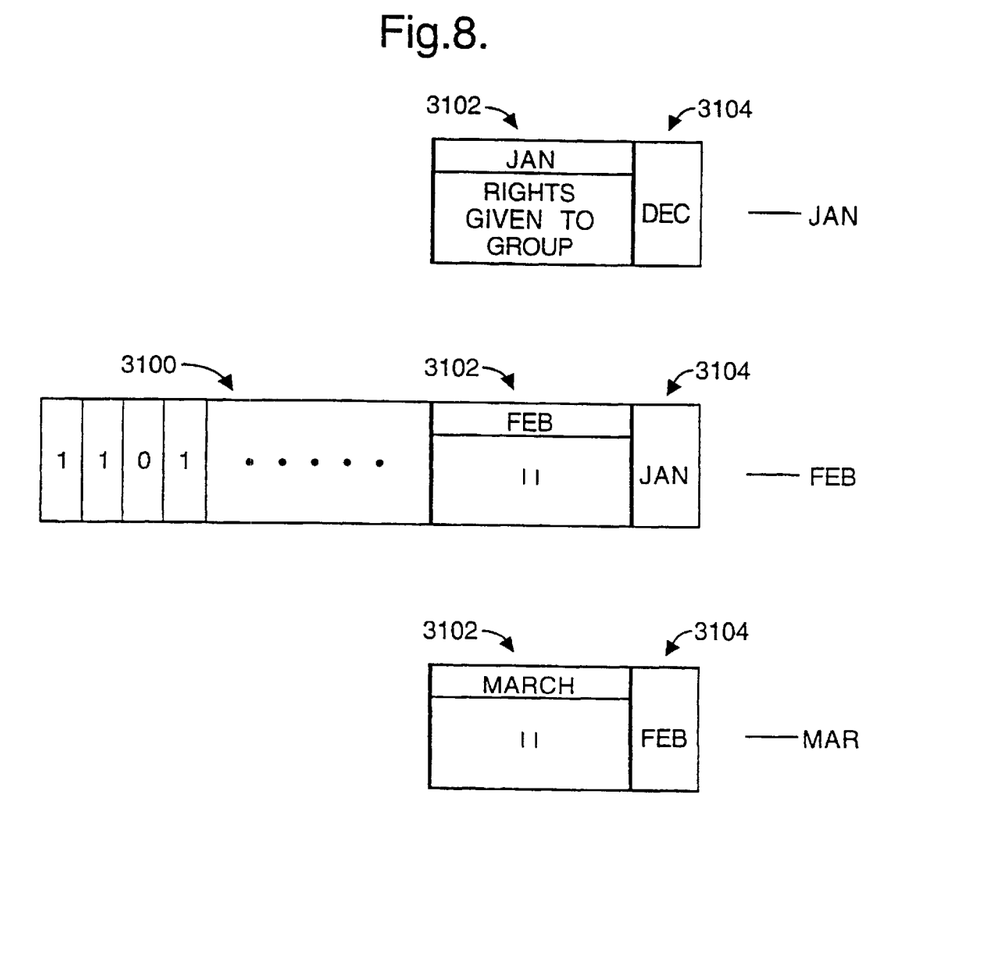
FIG. 8 illustrates a further preferred embodiment.

As one variant on the above, if all subscribers have correctly paid their subscription, it may not be necessary to send a subscriber's bitmap with the EMM, since the message will entirely consist of positive 1 values. For simplicity, a bitmap may therefore only be sent for changes in subscriber, as shown in FIG. 8.

It will be understood that the present invention has been described above purely by way of example, and modifications of detail can be made within the scope of the invention.

What is claimed is:

1. A method of preventing fraudulent access in a conditional access system which is linked to a subscriber's receiver/decoder for receiving an entitlement management message (EMM) for a group of subscribers to enable said system to provide access for a respective subscriber, the method including the step of:

programming the receiver/decoder only to accept a current EMM of a current calendar period if it has received at least a previous EMM of a previous calendar period.

2. A method according to claim 1 further comprising the steps of:

transmitting redundant date information with the current EMM; and receiving the current EMM and using redundant date information to check whether said previous EMM has been received.

3. A method according to claim 2 wherein each EMM contains rights date information concerning a current right of access and corresponding check date information concerning a previous right of access, such check date information constituting the redundant date information.

4. A method according to claim 2 wherein the redundant date information is an entitlement control message (ECM) key of a previous calendar period.

5. A method according to claims 2 wherein the subscriber rights change on a regularly timed basis and the redundant date information concerns an immediately preceding period.

6. A method according to claim 1 wherein the calendar periods are non-adjacent in time and/or there are irregular amounts of real time between such periods.

7. A method according claim 1 in which, optionally only when there are changes in subscriber rights, the current EMM includes a subscriber bitmap having positions representing subscription rights of the subscribers in the group.

8. A transmitter for use in a method of preventing fraudulent access in a conditional access system which is linked to a subscriber's receiver/decoder for receiving an entitlement management message (EMM) for a group of subscribers to enable said system to provide access for a respective subscriber, the receiver/decoder being programmed only to accept a current EMM of a current calendar period if it has received at least a previous EMM of a previous calendar period, the transmitter including:

means for transmitting redundant date information with a current EMM of a current calendar period so that the redundant date information can be used by the receiver/decoder to check whether said previous EMM has been received.

9. A transmitter according to claim 8 wherein each EMM contains rights date information concerning a current right of access and corresponding check date information concerning a previous right of access, such check date information constituting the redundant date information.

10. A transmitter according to claim 8 wherein the redundant date information is an entitlement control message (ECM) key of a previous calendar period.

11. A receiver/decoder for use in a method of preventing fraudulent access in a conditional access system, the receiver/decoder being linked to the conditional access system and being provided for receiving an entitlement management message (EMM) for a group of subscribers to enable said system to provide access for a respective subscriber, the receiverldecoder including:

means programmed only to accept a current EMM of a current calendar period if it has received at least a previous EMM of a previous calendar period.

12. A receiver/decoder according to claim 11 wherein said means is programmed to check whether said previous EMM has been received by using redundant date information contained in the current EMM.

13. A receiver/decoder according to claim 12 wherein each EMM contains rights date information concerning a current right of access and corresponding check date information concerning a previous right of access, such check date information constituting the redundant date information.

14. A receiver/decoder according to claim 12 wherein the redundant date information is an entitlement control message (ECM) key of a previous calendar period.

15. A transmitter for use in a method of preventing fraudulent access in a conditional access system which is linked to a subscriber's receiver/decoder for receiving an entitlement management message (EMM) for a group of subscribers to enable said system to provide access for a respective subscriber, the receiver/decoder being programmed only to accept a current EMM of a current calendar period if it has received at least a previous EMM of a previous calendar period, the transmitter being arranged to transmit redundant date information with a current EMM of a current calendar period so that the redundant date information can be used by the receiver/decoder to check whether said previous EMM has been received.

16. A transmitter according to claim 15 wherein each EMM contains rights date information concerning a current right of access and corresponding check date information concerning a previous right of access, such check date information constituting the redundant date information.

17. A transmitter according to claim 15 wherein the redundant date information is an entitlement control message (ECM) key of a previous calendar period.

18. A receiver/decoder for use in a method of preventing fraudulent access in a conditional access system, the receiver/decoder being linked to the conditional access system and being provided for receiving an entitlement management message (EMM) for a group of subscribers to enable said system to provide access for a respective subscriber, the receiver/decoder being programmed only to accept a current EMM of a current calendar period if it has received at least a previous EMM of a previous calendar period.

19. A receiver/decoder according to claim 18 programmed to check whether said previous EMM has been received by using redundant date information contained in the current EMM.

20. A receiver/decoder according to claim 19 wherein each EMM contains rights date information concerning a current right of access and corresponding check date information concerning a previous right of access, such check date information constituting the redundant information.

21. A receiver/decoder according to claim 19 wherein the redundant date information is an entitlement control message (ECM) key of a previous calendar period.

\* \* \* \* \*